July 10, 1951  W. J. GARMANY, JR  2,559,611
POWER REGULATOR
Filed Oct. 15, 1948
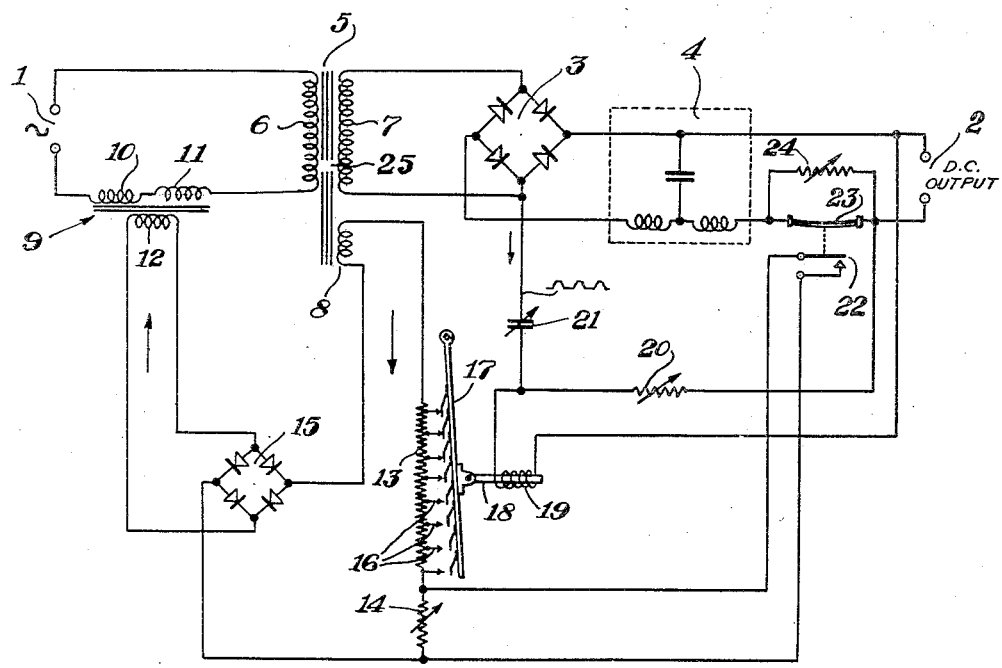
INVENTOR.
WILLIAM J. GARMANY, JR.
BY
ATTORNEY Patented July 10, 1951

2,559,611

UNITED STATES PATENT OFFICE 2,559,611

POWER REGULATOR

William J. Garmany, Jr., South Orange, N. J., assignor to Federal Telephone and Radio Corporation, New York, N. Y., a corporation of Delaware Application October 15, 1948, Serial No. 54,679

6 Claims. (Cl. 323—66)

My invention relates to power regulators and is particularly directed to improvements for maintaining between very narrow limits the voltage and current supplied to a load. The regulator of my invention is of the type which rectifies alternating current and applies the rectifier output to a direct current load.

An object of my invention is to provide a power regulator which will produce a direct current voltage that may be adjusted easily to any preselected value within a wide range of values and which will accurately maintain the voltage at the selected value.

Another object is to provide a power regulator which will not only accurately maintain the voltage at a load but will be responsive to and control the current supplied to the load.

My improved regulator comprises, essentially, a rectifier between an alternating power source and the load, and a saturable core reactor in the line to the alternating current source. A direct current winding on the core receives a controlled amount of current in response to and proportional to the rectifier output voltage, the winding current preferably though not necessarily being obtained directly from the alternating source through a second rectifier. The amount of saturating current fed to the winding is, in the embodiment illustrated, controlled by the resistors of a solenoid-operated potentiometer, the solenoid being connected to the load-voltage to be regulated. Upon the direct current for the solenoid is superposed an alternating component of the source, which tends to vibrate slightly the movable parts of the potentiometer in such a way as to eliminate frictional resistance in the parts. The result is a very accurately regulated voltage.

Another feature of my regulator is the manner by which I increase the minimum current for no load conditions, whereby the ratio of maximum to minimum current that the reactor must control is greatly reduced. This I accomplish by introducing an air gap into the core of the transformer employed between the reactor and the load.

The above mentioned and other features and objects of this invention and the manner of attaining them will become more apparent and the invention itself will be best understood, by reference to the following description of an embodiment of the invention taken in conjunction with the accompanying drawing, wherein the single figure is a circuit diagram of one of my novel regulators.

The power source 1 contemplated is alternating current and may be of commercial voltage and frequency, while the load 2 is of the type requiring a steady direct voltage and current. The rectifier 3 shown is the full-wave type and may comprise the well known semi-conductor dry plates or electron or gaseous discharge devices. The usual filter 4 for smoothing the rectified power is shown. The transformer 5 is employed with primary and secondary winding, 6 and 7, to obtain the desired ratio of source and load voltages. A third winding 8 on the core supplies a voltage for regulating purposes, to be described.

In series with one line of the source is connected a saturable core reactor 9. The windings 10 and 11 on the core are connected in series with the source and the third winding 12 is connected to a direct current source and is designed to magnetically saturate the core to the desired degree. The necessary degree of saturation is determined by the inductive reactance required to maintain the voltage at the load. That is, as the voltage at the load tends to increase or decrease because of load changes or because of variation or drift of the source voltage, compensating changes in the inductive reactance of the reactor are made.

Saturating current for the reactor is conveniently obtained from the winding 8 of the power transformer the terminals of which are connected through the resistors 13 and 14 of the rheostat and the auxiliary full-wave rectifier 15 to the saturating winding. The amount of power fed back from the transformer to the reactor may, hence, be controlled by controlling the effective amount of resistance in the feed-back circuit. A plurality of taps 16 to the resistance and the aligned contacts serve to successively short circuit all or a selected portion of the resistance through the rod 17 movable by the armature 18 in the field of the solenoid winding 19. The solenoid winding is connected across the load terminals so that the pull of the winding on the armature, against a spring or gravity, is responsive to changes in the voltage at the load terminals. The mean voltage about which the solenoid and its armature will operate, and hence the voltage that will be maintained at the load terminals is manually adjustable to any desired value by the resistors 20.

Alternatively, the saturating current for winding 12 may be obtained from a separate and independent source. If a battery source, for example, was employed, the auxiliary rectifier 15 could be eliminated.

According to a further and important feature of my invention a pulsating or alternating component of the source voltage is superposed on the steady voltage at the solenoid winding. The condenser 21 is connected between one terminal of the winding and a point in or ahead of the rectifier 3. With the condenser-solenoid circuit connected across one leg of the rectifier as shown, one half of the alternating wave of the source flows through the solenoid winding. With the condenser-solenoid circuit connected across the output diagonal of the rectifier, a double-frequency pulse current will of course flow in the solenoid winding. Experience with regulators of the type shown indicates that the vibration imparted to the armature and its moving parts by the pulse current effectively eliminates the static friction of the parts and makes the armature responsive to minute voltage changes at the output terminal. The vibration of the armature also gives better regulation in that vibrating movement of armature 17 for any given position thereof causes one or more fingers to continually open and close with the corresponding contacts 16. Early models of my power regulator have held the voltage at the terminals to within plus or minus 2 percent of the voltage selected by the resistor 20.

A further highly useful feature of my power regulator is the automatic limitation of the current to the load to a predetermined level. The resistor 14 connected in series with the rheostat 13 is selectively short circuited to include or exclude the resistor in the feed-back circuit. One of the contacts 22 is carried on a bimetallic strip 23 in the load circuit and is adapted to open the contacts when the current in the load circuit is equal to or exceeds a predetermined value. When the contacts open, resistor 14 is inserted, the feed-back current is reduced, the degree of saturation of the core is reduced, and the reactance of the reactor coils increases thus reducing the power fed to the load. The current level at which the bimetal strip operates may easily be adjusted by the resistor 24 shunted across the bimetal. Alternatively, the contacts 22 may be operated by the current winding of a relay, in the manner of a conventional overload circuit breaker.

The core of the transformer 5 is provided with one or more air gaps 25 so as to reduce the ratio of maximum to minimum current to be controlled by the reactor 9. By introducing these air gaps into the transformer core, I provide a minimum current load for the reactor 9 without increasing the actual loading of the transformer.

My novel power regulator, accordingly, regulates both voltage and current within narrow limits, the operating values being easily adjusted as desired. The narrow limits of voltage regulation is in part attributed to the frictionless moving members of the feed-back potentiometer.

While I have described the principles of my invention in connection with specific apparatus, it is to be clearly understood that this description is made only by way of example and not as a limitation to the scope of my invention.

I claim:

1. A circuit having a line to be regulated, a saturable core reactor, a transformer, a power rectifier and a filter serially connected in said line, auxiliary windings on the cores of said transformer and said reactor, an auxiliary rectifier and variable resistance elements connected between said windings, a solenoid winding, and an armature controlled by said solenoid winding to vary said resistance elements, said solenoid winding being connected across the output of said filter to receive a major direct current voltage therefrom, and said solenoid winding also being coupled, capacitively, to a point of pulsating minor voltage in one of said rectifiers whereby continuous minor vibratory motion of the armature results.

2. In a circuit having an alternating current source a transformer across said source and a primary rectifier means connected thereto; a voltage regulator comprising a saturable core reactor connected in circuit on the input side of said transformer, a secondary rectifier means, a variable resistance device connected in circuit with said secondary rectifier between the output of said transformer and a winding of said reactor, and means to control operation of said variable resistance device including connections for application to said device of direct current of minor voltage from the output of said primary rectifier means and an alternating current component of minor voltage derived from said alternating current source.

3. In a circuit according to claim 2, wherein said resistance device includes a plurality of resistors, an armature controlled switch for cutting said resistors in and out of said circuit, a solenoid to control said armature and the connections for applying the alternating current component of minor voltage being connected to said solenoid and across at least a part of said primary rectifier.

4. In a circuit according to claim 2 further including a filter in the output circuit of said rectifier, and wherein the means for applying direct current of major voltage and the alternating current component of minor voltage for operation of said variable resistance device includes connections to the output of said filter for the direct current and connections to the primary rectifier circuit on the input side of said filter for the alternating current component.

5. In a circuit according to claim 2 wherein said transformer has an air gap to provide a minimum current for said reactor during no load condition.

6. In an electrical circuit, an alternating current source, a load circuit including a transformer and a primary rectifier, a saturable core reactor connected in circuit on the primary side of said transformer, a variable resistance device and a secondary rectifier connected in circuit between the secondary side of said transformer and a winding of said reactor, said transformer having an air gap in the core thereof to provide a given minimum current for no load condition, and means for deriving a direct current of major voltage and alternating current of minor voltage from the secondary side of said transformer to control operation of said variable resistance device.

WILLIAM J. GARMANY, Jr.

REFERENCES CITED

The following references are of record in the file of this patent:

UNITED STATES PATENTS

| Number | Name | Date |
|---|---|---|
| 626,848 | Wills | June 13, 1899 |
| 1,158,001 | Neeley | Oct. 26, 1915 |
| 2,442,737 | Walker | June 1, 1948 |
| 2,450,012 | Master | Sept. 28, 1948 |